July 23, 1935.   J. B. FREYSINGER   2,009,192
HANDLE FOR PORTFOLIOS AND THE LIKE
Filed April 17, 1933
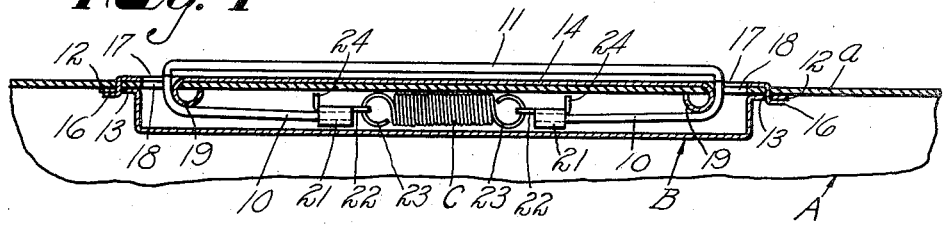
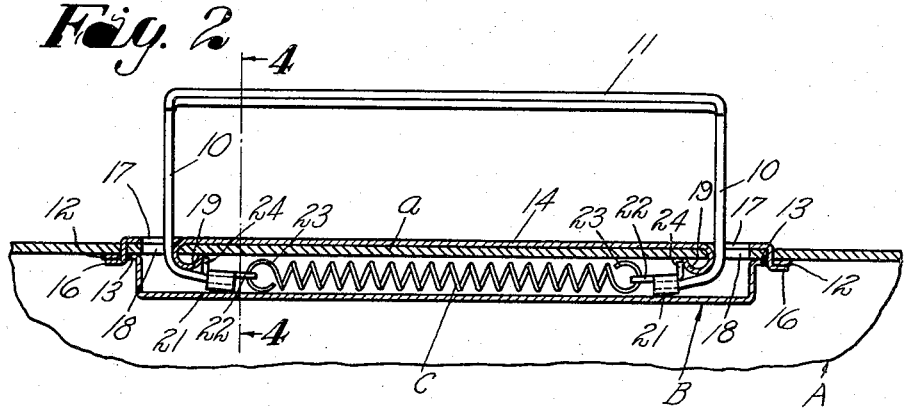
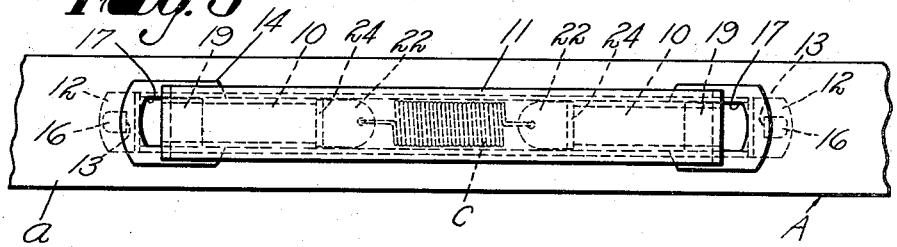
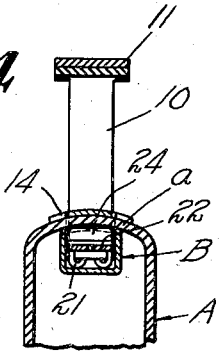
Inventor
John B. Freysinger
By
Attorney Patented July 23, 1935

2,009,192

UNITED STATES PATENT OFFICE 2,009,192

HANDLE FOR PORTFOLIOS AND THE LIKE

John B. Freysinger, New Britain, Conn., assignor to North & Judd Manufacturing Company, New Britain, Conn., a corporation of Connecticut Application April 17, 1933, Serial No. 666,421

2 Claims. (Cl. 150—12)

This invention relates to handles for portfolios, brief bags, and similar cases, and has for its object to provide an improved arrangement wherein the handle, when released, will be automatically drawn to a position against the bag and maintained in that position. Thus, when the handle is not in use, it is out of the way, the appearance of the portfolio is improved, and the inconvenience of a projecting handle as, for example, when it is desired to tuck the portfolio under the arm, is eliminated.

A further aim of the invention is to provide a handle of this sort having various features of novelty and advantage and which is particularly characterized by its simplicity in construction, its economy in manufacture, and the ease and facility with which it may be applied to a portfolio.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown one embodiment which the present invention may take, Fig. 1 is a longitudinal sectional view through my improved construction, a portion only of the brief bag or portfolio to which it is attached being illustrated and the handle being shown in its retracted position;

Fig. 2 is a view similar to Fig. 1 showing the handle withdrawn to operative or carrying position;

Fig. 3 is a top plan view of what is shown in Fig. 1; and

Fig. 4 is a sectional view taken substantially on line 4—4 of Fig. 2.

Referring to the drawing in detail, A denotes generally a portfolio, brief bag or the like which may have a top wall $a$. The portfolio or brief case may be of any suitable construction and may be formed of any desired material, for example, leather, and the top wall, if desired, may be suitably reinforced.

Secured to the underside of the top wall of the portfolio is an elongated, shallow, narrow box B which houses a contractible spring C the opposite ends of which are respectively connected to the flexible arms 10 of the handle which has a grip portion 11. The box B is preferably formed from sheet metal, and is open at its top. Extending outwardly from the upper edges of the end walls of the box are tongues 12, slotted, as at 13, and engaging the under surface of the top wall of the portfolio. On the opposite or upper face of the top wall of the portfolio is a metal strip or escutcheon plate 14 of any desired shape and configuration. At each end of this escutcheon plate is a downwardly extending lug which extends through the slot 13 in the respective tongue 12. The lower ends of these lugs are bent outwardly, as at 16, so as to underlie the tongues 12 and thereby securely anchor the escutcheon plate and box to the top wall of the portfolio. The escutcheon plate has adjacent each end an opening 17 corresponding in width to the width of the arms 10 of the handle, and the top wall $a$ of the brief bag has corresponding registering openings 18. The openings 17 are preferably formed by slitting the escutcheon plate to form tongues, and these tongues, designated by the numeral 19, are bent over the inner edges of the respective openings 18, thus further anchoring the escutcheon plate in place.

The handle may be formed of a strip of leather or the like so that the arms 10 are readily flexible or pliable. By preference, the grip portion of the handle is reinforced and made rigid, as by means of a strip secured to the underside thereof. The arms 10 project through the registering openings 17 and 18 and their lower ends are housed within the box B. Secured to the ends of the arms are suitable clips 21 provided with apertured ears 22. The spring C, which is preferably in the form of a coil, has at its opposite ends eyes 23 which are threaded through the apertures in the respective ears 22 of the clips so that the spring has a normal tendency to move these clips towards each other in the box. The clips, at their outer ends, have integral upwardly extending projections 24 which are adapted to engage suitable stops on the under side of the top wall of the portfolio in order to limit the extent to which the handle may be drawn out. In the present instance, the opposed ends of the tongues 19 constitute these stops, as is illustrated most clearly in Fig. 2.

It will be seen from the foregoing description, taken in connection with the accompanying drawing, that when the handle is released the spring will automatically draw the arms into the box and cause the grip portion to move from the extended position shown in Fig. 2 to the retracted position shown in Fig. 1 and in which latter position it lies closely against the portfolio, where it is out of the way. When it is desired to use the handle for carrying the portfolio, it is merely necessary to raise the handle from the position shown in Fig. 1 to the position shown in Fig. 2. Thus the handle is always available for use, and when not in use it lies closely adjacent the portfolio. It will further be seen that the construction is a very simple and economical one and that the parts may be very readily assembled.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A handle for portfolios and the like, comprising a box, an escutcheon plate, said box and plate adapted to be fitted against the opposite sides of the wall of a portfolio, said plate having end lugs for passage through the wall and interlocking engagement with the box and further having openings near the lugs with the tongues cut from the openings for rolling inwardly through the wall and against the underside thereof to clamp the plate to the wall, a hand grip having flexible ends for sliding engagement through the openings in the plate, a spring in the box, and detachable couplings between the ends of the spring and the flexible ends of the hand grip for normally drawing the latter into the box, said couplings adapted to engage the rolled over tongues and limit the outward pull of the hand grip.

2. A handle for portfolios and the like, comprising a shallow long box adapted to be fitted against the inner side of a wall of a portfolio and having apertured end flanges to engage the wall, an escutcheon plate for engagement against the outer side of the wall and having end lugs for passage through the wall and the flanges of the box and adapted to be overturned against the flanges to secure the box and the plate in position, said escutcheon plate having near its ends inwardly cut and rolled tongues adapted to extend through the wall of the portfolio and clamp the latter against the underside of the escutcheon plate, said tongues providing openings through the escutcheon plate and providing inwardly facing stop shoulders in the opposite ends of the box, a hand grip disposed at the outer side of the escutcheon plate and having flexible ends slidably engaging through the plate openings and over the rolled tongues, a contractible spring in the box, and couplings between the opposite ends of the spring and the flexible ends of the hand grip and having projections for engagement with the rolled tongues to limit the outward pulling of the ends of the hand grip.

JOHN B. FREYSINGER.